(12) United States Patent
Müller et al.

(10) Patent No.: US 6,217,476 B1
(45) Date of Patent: Apr. 17, 2001

(54) TORQUE-TRANSMITTING DEVICE AND METHOD FOR STARTING A PRIME MOVER UNIT

(75) Inventors: Bruno Müller, Bühlertal; Uwe Wagner, Sinzheim-Leiberstung, both of (DE); Thomas Heck, Wooster, OH (US)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/409,034

(22) Filed: Sep. 29, 1999

(30) Foreign Application Priority Data

Oct. 1, 1998 (DE) .............................................. 198 45 303

(51) Int. Cl.⁷ .................................................. B60K 41/02
(52) U.S. Cl. .................................... 477/5; 477/8; 477/12; 192/25
(58) Field of Search ...................... 477/5–12; 290/31–47; 192/3.21–3.25, 3.27

(56) References Cited

U.S. PATENT DOCUMENTS

| | | | | |
|---|---|---|---|---|
| 3,581,851 | * | 6/1971 | Hall et al. ............................ | 192/3.25 |
| 4,410,071 | * | 10/1983 | Ostermann ......................... | 192/3.25 |
| 4,629,042 | * | 12/1986 | Gaus et al. .......................... | 192/3.25 |
| 4,743,776 | * | 5/1988 | Baehler et al. ....................... | 290/31 |
| 5,789,823 | * | 8/1998 | Sherman ............................ | 477/5 X |
| 6,050,375 | * | 4/2000 | Gradu et al. ........................ | 192/3.22 |

* cited by examiner

*Primary Examiner*—Sherry Estremsky
(74) *Attorney, Agent, or Firm*—Darby & Darby

(57) ABSTRACT

A torque-transmitting device is connected to a prime mover unit and a speed-changing transmission and includes a hydrodynamic torque-converter or fluid coupling with a pump wheel, a turbine wheel and in some cases a stator wheel. The torque-transmitting device has a disconnecting clutch to uncouple it from the prime mover unit.

52 Claims, 4 Drawing Sheets

TORQUE-TRANSMITTING DEVICE AND METHOD FOR STARTING A PRIME MOVER UNIT

BACKGROUND OF THE INVENTION

The invention relates to a torque-transmitting device, particularly for motor vehicles, with a prime mover unit such as a combustion engine with a driving shaft, a speed-changing transmission with a transmission input shaft, and a hydraulic coupling device between the prime mover unit and the transmission, i.e., a fluid coupling such as a Föttinger coupling, or a hydrodynamic torque converter, consisting of at least a pump wheel connected to the torque-input side and a turbine wheel connected to the torque-output side, as well as in some cases a stator wheel interposed between the pump wheel and the turbine wheel, and at least one housing solidly connected to the pump wheel and containing the turbine wheel.

Devices of this kind have been known for a long time and have been optimized for a great variety of diverse tasks and requirements. In order to completely disengage the torque-transmitting unit from the prime mover unit, DE-OS 40 07 424 proposes the use of a mechanical clutch arranged outside of the housing between the prime mover unit and the torque-transmitting unit, where the mechanical clutch either comprises a separate piston housing for the hydraulic control of the clutch or requires the axial displacement of a housing shell for disengaging the clutch. Thus, the proposed solution requires more space in the axial direction and is expensive to implement.

OBJECT OF THE INVENTION

Therefore, the object of the present invention is to provide a torque-transmitting device that comprises a disconnecting clutch between the hydraulic coupling device (i.e., a fluid coupling or hydrodynamic torque converter) and the prime mover unit but requires neither appreciably more axial space nor additional external actuator means for the disconnecting clutch while at the same time offering the advantage of a simple and cost-effective design.

SUMMARY OF THE INVENTION

The invention is embodied in a torque-transmitting device comprising a prime mover unit such as a combustion engine with a driving shaft, a speed-changing transmission with a transmission input shaft, and a hydraulic coupling device between the prime mover unit and the transmission, i.e., a fluid coupling such as a Föttinger coupling, or a hydrodynamic torque converter, comprising at least a pump wheel connected to the torque-input side and a turbine wheel connected to the torque-output side, as well as in some cases a stator wheel interposed between the pump wheel and the turbine wheel, at least one housing solidly connected to the pump wheel and enclosing the turbine wheel, and also comprising at least one disconnecting clutch that is arranged inside the housing and serves to uncouple the housing from the prime mover unit.

Accordingly, the disconnecting clutch can be arranged in a space-saving manner immediately inside the housing and without the need for additional housing parts.

It is particularly advantageous to use the disconnecting clutch to uncouple the prime mover unit from the fluid coupling or torque converter with the speed-changing transmission because the two aggregates can be operated independently of each other. Thus, for example, an electric machine driving the torque converter can power the motor vehicle when the prime mover unit is uncoupled, or the prime mover unit can power only additional auxiliary aggregates without driving the torque-transmitting device.

In advantageous arrangements, the electric machine is rotationally locked to the housing, for example by means of toothed profiles, friction wheels, belt drives or chains; or the electric machine may be arranged immediately around the housing with the rotor being solidly attached to the housing so that it rotates together with the latter. Thus, the "stator" is mounted on and rotates with the housing of the electric machine i.e. has a non-rotatable connection to a component, e.g., to the housing or a supporting holder mounted on the housing, of either the prime mover unit or the speed-changing transmission. The latter may be, for example, an automatic step-shifting transmission, continuously variable transmission or the like.

The housing of the torque-transmitting device, particularly in combination with an attached rotor, represents the inertial mass for the prime mover unit. To increase the moment of inertia, the rotor can be equipped with an additional inertial mass that is preferably arranged between the prime mover unit and the torque-transmitting unit and preferably has a shape that conforms, but leaves a clearance, to the contour of the one half of the housing that faces towards the prime mover unit, to make optimum use of the available space.

An inventive embodiment of the disconnecting clutch may consist, e.g., of an axially movable piston with preferably at least one friction lining arranged near the outer perimeter by which the piston engages a corresponding friction surface on the housing or on a component connected to the housing; or the piston may comprise a pressure surface by which it acts against laminar clutch disks that are attached to the housing to form a frictional coupling. In an advantageous arrangement, the at least one friction lining can be mounted on a conically sloped, ring-shaped exterior part of the piston conforming to the conical shape of the one half of the housing facing towards the side of the prime mover unit. This allows the centrifugal effect of the rotating housing to generate greater amounts of contact pressure and to thereby increase the amount of torque that can be transmitted.

When the clutch is engaged, to transmit the torque from the driving shaft to the housing and thus to the pump wheel that is solidly attached to it, the piston according to the invention can be arranged around and rotationally locked to a connecting part of the driving shaft that extends into the housing. The connecting part is, e.g., centered on or in the driving shaft and non-rotatably connected to the latter through an axially flexible and rotationally stiff torque-transmitting sheet-metal plate, the connecting part being attached to the torque-transmitting sheet-metal plate through a radially oriented flange-like part. The connecting part can also be formed by the driving shaft itself.

It is further advantageous to actuate the piston by means of the pressure supplied by the existing oil pump that is used to run the transmission. A chamber is formed for this purpose between the housing wall on the prime mover side and the piston, which can be supplied with oil, e.g., via a bore through the transmission input shaft, thereby creating a positive pressure differential relative to the pressure in the housing. The pressure differential causes the piston to move axially in the direction towards the turbine wheel and thereby retracts the friction layers from the housing wall or opens a set of laminar disks, so that the clutch is disengaged. The axial travel of the piston can be induced, e.g., by means of a toothed profile on the connecting part, or the piston can be solidly attached to the connecting part via a ring-shaped intermediate part, the latter being axially movable. The axial travel can also be made to work against the force generated by leaf springs that are distributed over the perimeter and are connected to the piston at the ends facing towards the perimeter and at their opposite ends to a driving part, e.g., to the housing or the connecting part, or else to a part that has a force-transmitting relationship to the housing or the connecting part. The axial travel is compensated for by the intermediate part, which for this purpose may have a wave-shaped cross-section. The peaks and valleys of the waves can advantageously be arranged transverse to the radial direction of the ring.

It may furthermore be advantageous to provide the torque-transmitting device with a lockup clutch of an essentially known design in order to bypass the torque converter when the rpm of the prime mover unit exceeds a set, pre-determined rpm value and to conduct the torque flow directly from the housing to the transmission input shaft. In an advantageous configuration, the lockup clutch, likewise, is shaped as a piston that may be of a design corresponding to that of the piston of the disconnecting clutch. The piston has a rotationally locked and axially movable mounting connection to the driven side, e.g., on the turbine hub.

In an embodiment according to the invention, the disconnecting clutch piston may have a friction surface on the reverse side of where the friction lining is attached, and the lockup clutch piston may have at least one friction lining at the same radial location, so that a frictional engagement occurs on the disconnecting clutch piston. A second chamber is being formed by the two pistons, which can be kept open by establishing a pressure in excess of the interior pressure of the torque converter and is closed by reducing the pressure. The pressure build-up occurs by adding pressure medium, preferably a converter medium such as oil or automatic transmission fluid (ATF), which may be introduced, e.g., through an opening from the space between the rotationally locked seat of the stator wheel and the transmission input shaft.

In accordance with a further concept of the invention, a flange may be provided, preferably extending radially from the exterior perimeter towards the inside, that can comprise friction surfaces for both pistons, so that a discrete piston acts with its friction linings against each side, whereby a mutually independent operation of the two clutches can be provided. In an advantageous configuration, the flange that is fastened at its exterior perimeter and extends towards the inside conforms to the contour of the one half of the enclosure on the output side, whereby a space-saving configuration is achieved.

As a further advantageous design possibility, the two clutches may be arranged at a radial distance from each other, so that the friction linings of one clutch make frictional contact with the housing or a part connected to it at a smaller diameter and the friction linings of the other clutch make contact at a larger diameter. As an advantageous arrangement, the disconnecting clutch can be located at a smaller diameter in a bay of the housing towards the prime mover unit, and the lockup clutch can be arranged radially outside of the disconnecting clutch. Both pistons may have a conical shape to enhance the compressive force, so that the friction linings that contact the housing wall follow the contour of the latter and enclose an angle α between 90° and 180°, but preferably between 120° and 170°, with the direction perpendicular to the driving shaft or the direction perpendicular to the transmission input shaft. It can further be advantageous in view of the amounts of torque to be transmitted from the prime mover unit if a larger angle α is selected for the disconnecting clutch than for the lockup clutch.

There may further be an advantage in an embodiment with only one clutch that is capable of performing both the function of the disconnecting clutch and of the lockup clutch. For this purpose, the clutch can be connected through an axially movable control flange with a form-locking engagement to the driving shaft or its connecting part that extends into the housing, or it may be connected to the turbine wheel or its hub or similar element that is arranged on the transmission input shaft. The axially movable control flange may, e.g., consist of a U-shaped flange that is open towards the driving shaft and whose radially inner U-leg can be supported without rotational constraint on the transmission input shaft. At the outside circumference, the radially outer U-leg can have an external tooth profile for a form-locking engagement with an internal tooth profile oriented axially in the direction of the driving shaft, and the radially outer U-leg can also have an internal tooth profile to engage an external profile on a shoulder of the driving shaft or on its connecting part. The axial movement is effected by the application of pressure to the control flange. For example, a pressure channel may be provided in the transmission shaft that is directed towards the end face of the U-shaped control flange and moves the latter against the pressure of the medium in the converter. The reverse movement occurs when the pressure channel is opened, in which case the control flange can be moved backwards by the pressurized medium in the converter. When the clutch is used as a lockup clutch, the torque supplied by the prime mover unit can be transmitted by a free-wheeling element arranged between the driving shaft and the housing. The free-wheeling element is overrun when an electric machine arranged around the housing sets the latter into rotary motion.

Other advantageous embodiments of the invention may involve the use of a damper device that may work between the driving shaft and the housing and/or between the turbine wheel or the lockup clutch and the transmission input shaft. These kinds of damper devices can be based on an essentially known design that comprises an input member and an output member that are rotatable relative to each other as they work against the force of at least one energy-storage device such as a compressive helix spring, an arcuate spring, a rubber element and/or a similar device.

With the torque-transmitting device according to the invention it is possible for the prime mover unit and the torque-transmitting unit for a speed-changing transmission to function independently of each other, so that a method can be proposed in accordance with the invention whereby the motor vehicle may be powered alternatively by an engine and an electric machine. In an arrangement of this kind, the electric machine has a rotationally locked connection to the housing of the torque-transmitting unit, for example by means of toothed profiles or belt drives, or the electric machine is directly attached to the housing. Preferably, the rotor is arranged so that it surrounds the torque converter or fluid coupling. The disconnecting clutch is disengaged in the alternative power mode. The electric machine drives the housing as well as a transmission oil pump, whereby the torque converter is filled with fluid, so that the turbine wheel and thus the transmission input shaft are entrained by the rotating housing.

As a further advantageous mode of operation according to the invention, a method is proposed for starting the prime mover unit with the electric machine. In a first step, with the disconnecting clutch disengaged, the rotor and/or an inertial mass of the converter unit, e.g., the inertial mass of the torque-converter itself and/or an additional inertial mass that is attached to the rotor, is put into rotation and brought up to speed. In a second step, the disconnecting clutch is engaged, so that the rotation is imparted to the driving shaft and the prime mover unit is started. It is advantageous to actuate the clutch by using the pressure that is provided by the oil pump as soon as the electric machine starts to turn. As a further concept, an accelerated starting process can be proposed in which the disconnecting clutch is engaged as soon as there is sufficient pressure to perform the engagement. The resulting mixed mode between inertial start and direct start offers the possibility of using a lower rpm of the electric machine. When an external pump is used that is independent of the rpm of the electric machine, e.g., an electric pump, the disconnecting clutch can be engaged immediately and a direct start can be performed.

As is essentially known, after the prime mover unit has been started, an electric machine of this kind may be used as an electric power generator. The electric machine can be of the synchronous, asynchronous, or reluctance type or the like.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

The invention will be explained on the basis of FIGS. 1 through 4, all of which represent partial views of torque-transmitting devices in accordance with the invention.

DETAILED DESCRIPTION OF THE INVENTION

Figure 1:
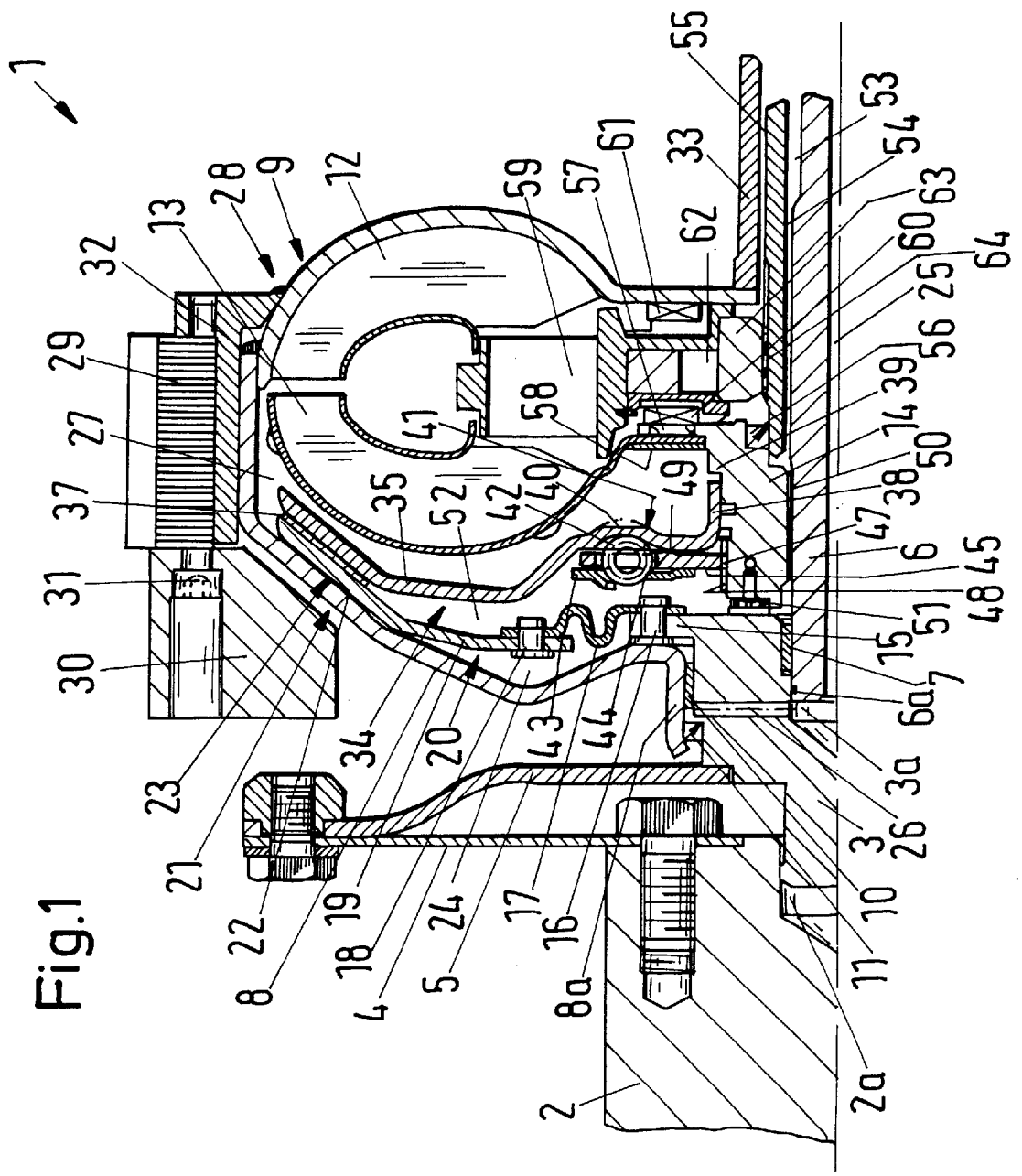

FIG. 1 represents an embodiment of a torque-transmitting device 1 with a driving shaft 2 belonging to a prime mover unit (not shown) and a connecting flange 3 that is received and centered in a recess 2a of the driving shaft 2. The flexible torque-transmitting sheet-metal plate 4 is bolted to the driving shaft 2 and to a sheet-metal connector plate 5 that is centered on and welded to the connecting flange 3. To eliminate axial vibrations of the prime mover unit, one of the sheet-metal plates 4, 5 in this arrangement may have resilience in the axial direction. Angular and axial misalignments between the driving shaft 2 and the connecting flange 3 can be compensated for through the flexible torque-transmitting sheet-metal plate 4.

To seat the connecting flange 3 on the transmission input shaft 6, the connecting flange 3 has a recess 3a where the transmission input shaft 6 is axially received with an interposed slide bushing 7 and the transmission input shaft 6 is sealed against the connecting flange 3 by means of a seal 6a. The housing part 8 at the prime mover side of the housing 9, e.g., a sheet-metal stamping, has an axially extending portion 8a serving as support flange where the housing part 8 is rotatably supported on the outside circumference of the connecting flange 3 with a slide bushing 10 and sealed by means of the seal 11. The housing part on the opposite side from the prime mover unit is welded to the pump wheel 12 whereby the converter housing 9 is formed. Through the converter medium, e.g., oil or automatic transmission fluid (ATF), the pump wheel 12 drives the turbine wheel 13 that is mounted on a hub 14.

At the end that faces towards the turbine wheel 13, the connecting flange 3 spreads out into a radially extending flange portion 15 which, by means of rivets 16 distributed along its circumference, holds a ring-shaped intermediate part 17 of undulating cross-section. The undulating shape provides resilience to allow axial movement. At its outer radius, the intermediate part 17, again by means of rivets 18 distributed along its circumference, holds a piston 19 for a disconnecting clutch 20. The radially outer portion 21 of the piston 19 is cone-shaped to conform to the corresponding contour of the housing part 8 and carries a friction lining 22 that engages the friction surface 23 of the housing part 8 when the clutch 20 is engaged. Due to the conical shape of the outer portion 21 of piston 19, the contact force, being dependent on the rpm of the housing 9, becomes greater with the increase in the centrifugal forces.

The disconnecting clutch 20 is controlled by the pressure of a medium in the chamber 24 that is formed by the piston 19 and the housing part 8. To accomplish this purpose, a pressure-generating device (not shown) supplying the torque-converter 28 and the transmission (which follows the converter in the torque-flow path) pumps converter medium through a bore 25 in the transmission input shaft 6, a feeder hole 26, and a connector opening (not shown) of the slide bushing 10 or the connecting flange 3 into the chamber 24, building up the pressure in chamber 24 to the point where it exceeds the pressure in the converter chamber 27. The resulting axial movement of the piston 19 causes the friction lining 22 to exhibit an increasing amount of slippage until it is completely retracted so that separation of the driving shaft 2 from the housing 9 occurs and the torque converter 28 is put out of operation. The friction lining 22 may also consist of a plurality of individual friction linings and/or of friction linings with various surface configuration that ensure the passage of a minimum amount of converter medium for cooling.

Among other applications, the use of a disconnecting clutch 20 is advantageous in embodiments comprising an electric machine (as shown). In the drawing, only the rotor 29 of the electric machine is indicated, being arranged around the housing 9 on a support 32 that is welded to the housing. The stator (not shown) is attached to a stationary, non-rotating part of the prime mover unit and/or of the transmission. To increase its moment of inertia, the rotor 29 is equipped with an additional inertial mass 30 that conforms to the contour of the cone-shaped portion 21 of the housing part 8 and is bolted to the rotor by means of screws 31 passing all the way through the support 32. When the electric machine is activated, the housing 9 rotates with the disconnecting clutch in an undefined state, i.e., not yet locked into frictional contact, and drives the oil pump that is connected to the housing, preferably to the neck 33 of the converter. The oil pump now supplies an increased amount of fluid to the chamber 24, which causes the disconnecting clutch 20 to disengage. When the housing 9 has attained enough momentum to start the prime mover unit, the pressure in the chamber 24 is reduced and the clutch 20 is engaged so that a frictional locking contact is made with the housing 9, whereby the rotation is transmitted to the driving shaft 2 and the prime mover unit is started. Once the prime mover unit is running, the electric machine is used as a power generator. If the electric machine is to be used as the only power source for the motor vehicle, the disconnecting clutch 20 remains permanently disengaged.

A lockup clutch 34 is provided for bypassing the converter 28. The lockup clutch 34 comprises a piston 35 with at least one friction lining 37 that may have a surface finish or configuration designed to assure the passage of a minimum amount of converter medium for cooling. The piston 35, too, has a conical shape in its radially outer portion that carries the friction lining 37. To perform its function, the piston 35, by means of an axially formed neck 38 extending towards the turbine wheel, is supported and centered on the turbine hub 14 with axial and rotational mobility, limited by a stop in the form of a radially stepped-up shoulder 39 of the turbine hub. The converter medium to supply the chamber 52 for disengaging the lockup clutch 34 is fed through the gap 53 between the transmission input shaft 6 and the hollow stator shaft 54. The pressure for engaging the lockup clutch 34 is built up by introducing converter medium into the converter chamber 27 through the annular gap 55 between the stator shaft 54 and the converter neck 33. To engage the disconnecting clutch 20, the pressure in the chambers 27, 52 is increased in relation to that in the chamber 24. A controlled amount of slippage is obtained in the lockup clutch 34 by varying the pressure in chambers 52, 27 but keeping the overall pressure in the two chambers 52, 27 sufficiently high for the disconnecting clutch 20 to remain engaged. Examples of reference values for the pressure ranges in the chambers 24, 27, 52 for controlling the clutches 20 and 34 are shown in Table 1.

TABLE 1

|  | Pressure in chamber 24 | Pressure in chamber 52 | Pressure in chamber 27 |
| --- | --- | --- | --- |
| Clutch 20 disengaged Clutch 34 disengaged | 5 bar | 4 bar | 3 bar |
| Clutch 20 engaged Clutch 34 disengaged | 0 bar | 11 bar | 10 bar |
| Clutch 20 engaged Clutch 34 slipping | 0 bar | 0–10 bar | 0–10 bar |

The radial contour of piston 35 roughly follows the shape of the turbine wheel 13. At a radius that lies inside of the greatest axial overhang of the piston 35 towards piston 19, pockets 40 are formed in the piston 35 to accommodate and take up the thrust of energy-storing elements 42 belonging to the damper device 41. In this manner, the piston 35 with pockets 40 in combination with a ring-shaped disk-like part 43 (to which the piston 35 is connected by spacer bolts that are not shown) with pockets 44 for the energy-storing elements 42 functions as an input member of the damper device 41. The output member is constituted by an axially interposed flange 45 with cutouts 46 for the energy-storing elements 42. At its inside circumference, the flange 45 has an internal tooth profile 47 that engages an external tooth profile 48 of the turbine hub 14 with rotational play. This provides a limited extent of relative rotation between the piston 35 and the turbine hub 14 in opposition to the force of the energy-storing elements 42 that can be distributed around the circumference. In combination with the friction device 49, this arrangement provides damping in case of rotational oscillations.

The turbine hub 14 is rotationally locked to the transmission input shaft 6 by means of the tooth profile 50, axially spaced apart from the connecting flange 3 by means of the stop contact 51 and sealed against the stator shaft by means of the seal 56. At a radius outside of the seal 56, the turbine hub 14 is provided with a radially outward-directed flange-like part 57 to receive the turbine wheel 13. The latter is attached to the circumference of the flange-like part 57, e.g., by pulsed resistance welding with the addition of a reinforcing ring 58 on the side of the turbine wheel 13 that faces away from the flange-like part 57. At its inside, the turbine wheel bears axially against the stator wheel 59 by means of the bearing 60, while the stator wheel 59, in turn, bears axially against the pump wheel by means of the bearing 61. The stator wheel is mounted on a free-wheeling hub 62 surrounding a flange-like part 63 with an internal tooth profile 64 providing a non-rotatable connection to the stator shaft.

Figure 2:
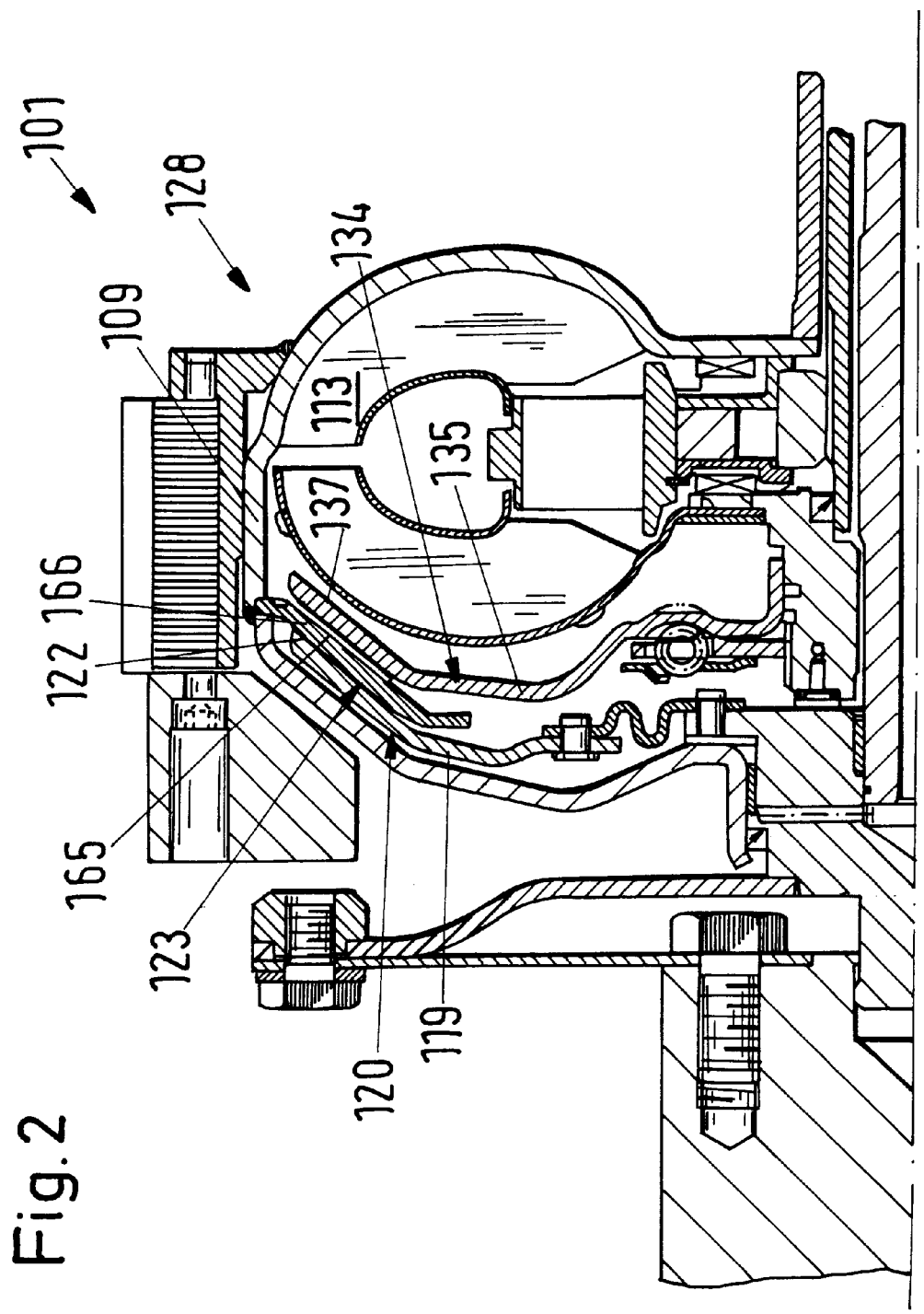

FIG. 2 represents an embodiment of a torque-transmitting device 101 that is similar to the embodiment of the torque-transmitting device 1 in FIG. 1 except that the following features are different:

The element that carries the friction surfaces 123, 165 of the disconnecting clutch 120 and the lockup clutch 134 is provided in the form of a flange 166 that is non-rotatably connected to the housing 109 of the torque converter 128 and comprises on its two sides the friction surfaces 123, 165 for the friction linings 122, 137 of the two clutches 120, 134. The flange 166 has a conical shape and slopes away from the turbine wheel 113. The pistons 119, 134 conform to this contour, and the axially movable piston 119 now becomes disengaged by feeding converter medium at a requisite pressure to the chamber 124 not shown in FIG. 2. This embodiment allows separate control and operation of the two clutches 120, 134, so that the lockup clutch 134 may be engaged or operated with slip while the disconnecting clutch 120 is disengaged. It is further possible to also operate the disconnecting clutch 120 in a slipping mode.

Figure 3:
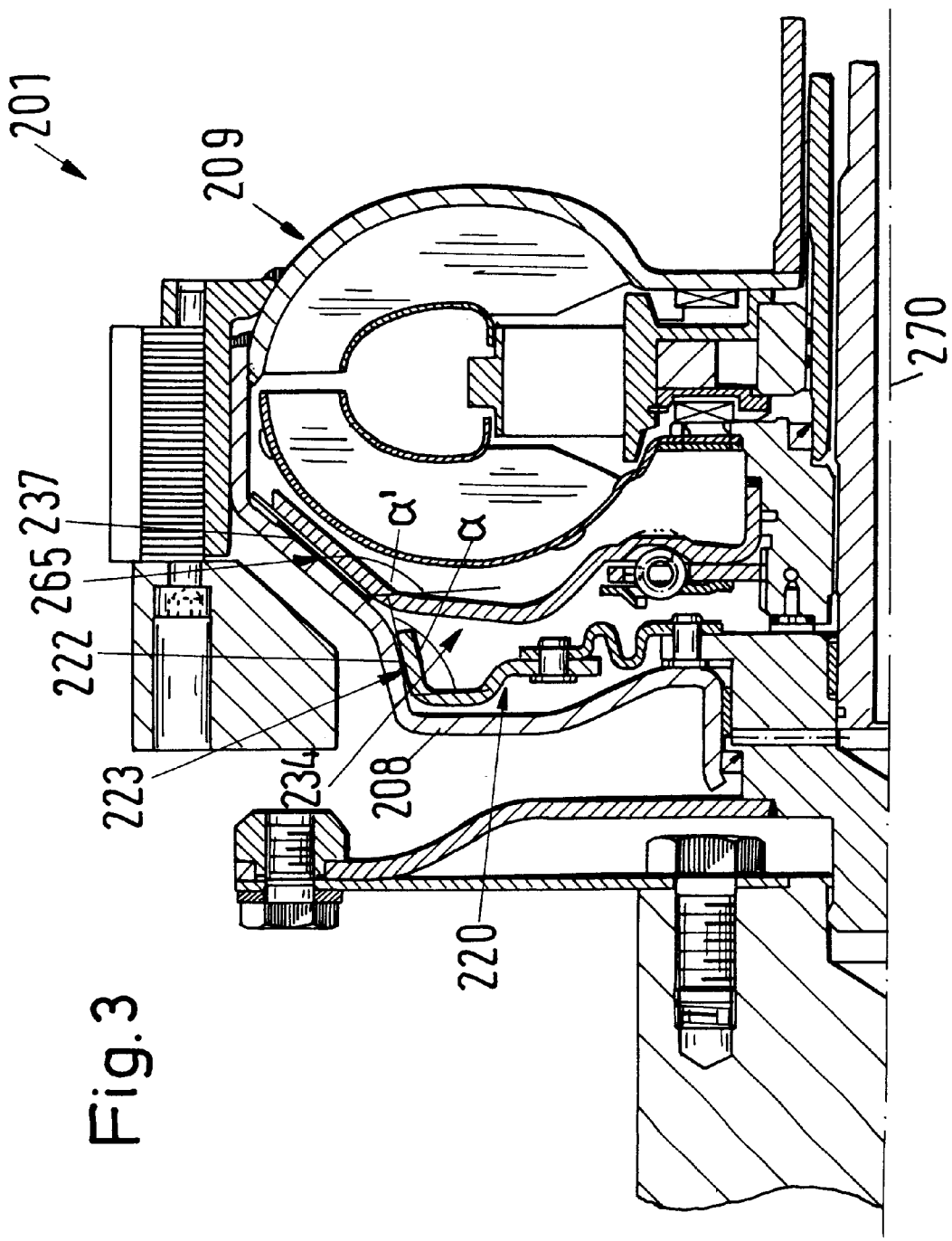

FIG. 3 represents an embodiment of a torque-transmitting device 201 similar to the preceding embodiments, comprising two independently controllable clutches 220, 234, that are equipped with friction linings 222, 237, respectively, to engage corresponding friction surfaces 223, 265 of the housing part 208 on the prime-mover side of the housing 209. The friction surface 223 for the disconnecting clutch 220 is arranged at a radius inside the friction surface 265 for the lockup clutch 234. Both friction surfaces have a conical shape, where the angle $\alpha$ between the direction perpendicular to the rotational axis 270 and the conical slope of the frictional surface 223 lies in the range $100°<\alpha<110°$. The corresponding angle $\alpha'$ for the lockup clutch lies in the range $130°<\alpha'<140°$. The choice of the angles $\alpha$, $\alpha'$ is a determining factor for the magnitude of the increased contact pressure of the friction linings 222, 237 against the friction surfaces 223, 265 as a result of the centrifugal force.

Figure 4:
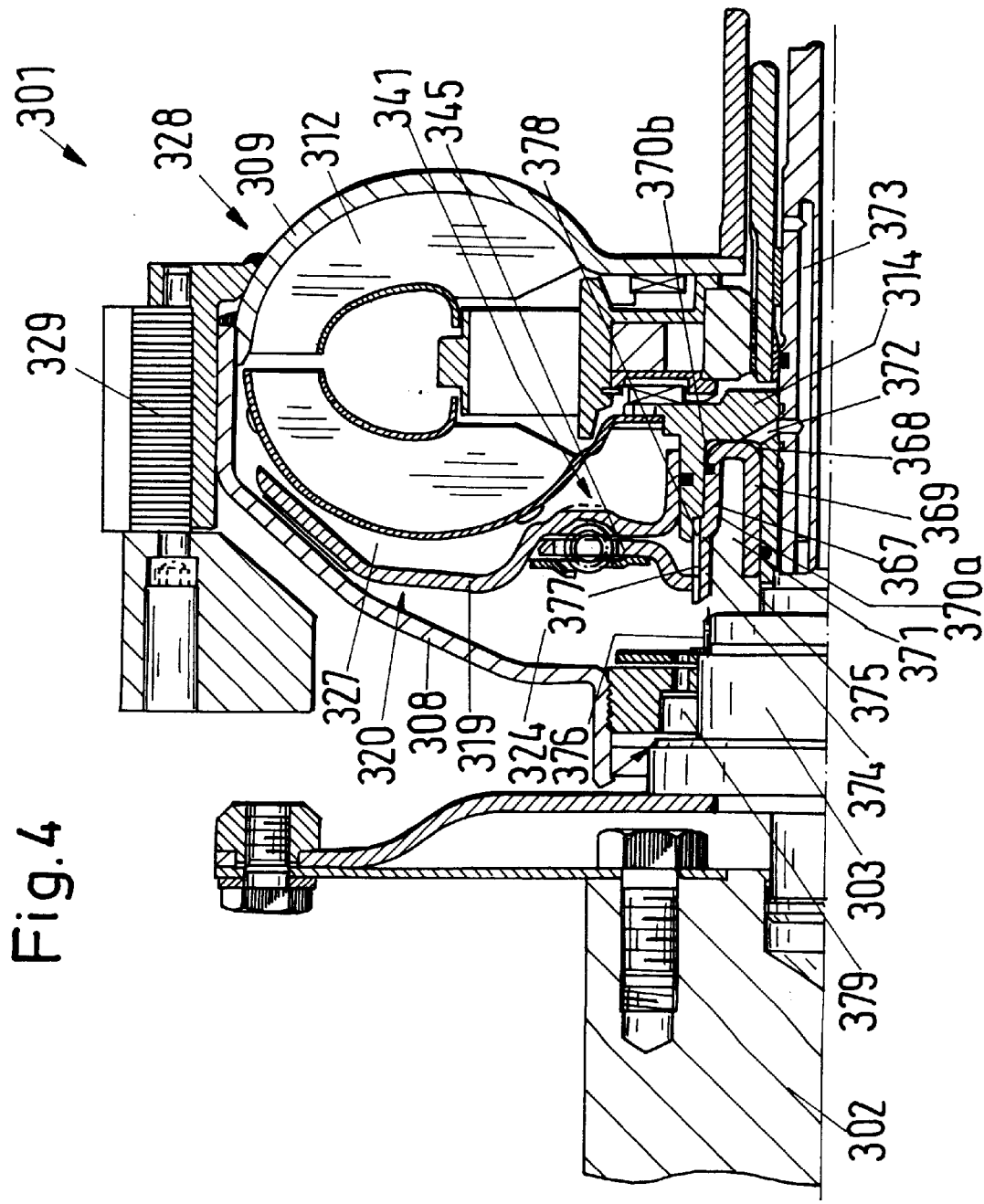

A further embodiment of a torque-transmitting device 301 according to the invention is shown in FIG. 4. It has a single clutch 320 that is used both as lockup clutch and disconnecting clutch. This is accomplished by arranging the piston 319 of the clutch 320 on an axially movable control flange 367 of U-shaped cross-section. The radially inner leg 369 of the control flange 367 is centered in a cylindrical recess 371 of the turbine hub 314 that opens towards the side of the prime mover. By means of the seals 370a, 370b, the control flange 367 forms a chamber 368 that is supplied through a supply bore 372 with converter medium from the hollow transmission input shaft 373. When the fluid in the chamber 368 is pressurized, the control flange 367 is moved axially against the pressure of fluid in the chamber 324 that is formed by the piston 319 and the housing part 308; or, if the pressure in chamber 324 is greater than in chamber 368, the control flange 367 is pushed in the reverse direction. Through this axial displacement of the control flange 367, an axially protruding internal tooth profile 374 of the radially outer leg 375 is brought into form-locking engagement with an exterior tooth profile 376 of the connecting flange 303 whereby a torque-transmitting connection with the driving shaft 302 is established. At the opposite end stop of the displacement range, an external tooth profile 377 is brought into form-locking engagement with the internal tooth profile 378 of the turbine hub 314. The external tooth profile 377 also engages the output member 345 of the damper device 3412 so that the latter is effective in both the separator and the lockup mode of the clutch.

To start the prime mover unit, the rotor 329 of the electric machine turns the housing 309 and, together with the housing 309, also drives the pump wheel 312 and an oil pump downstream in the torque-flow. The oil pump supplies pressure to the chambers 324, 368, thereby disengaging the clutch 320 and moving the control flange 367 axially towards the side of the prime mover unit so that the control flange is brought into form-locking engagement with the connecting flange 303. When the rotational momentum is sufficient to start the prime mover unit, the clutch 320 is engaged by pressurizing the fluid in the chamber 327 and the prime mover unit is started. The free-wheeling hub 379 that is interposed between the housing part 308 and the connecting flange 379 is overrun in this starting process. After the prime mover unit has been started, the pressure in chamber 368 is lowered, and at the same time the pressure is lowered in chamber 327 or raised in chamber 324, so that the resulting axial movement brings the control flange 367 into form-locking engagement with the turbine hub 314 and the clutch 320 is disengaged. Now, if the torque converter 328 is to be bypassed, the clutch 320 is engaged by pressurizing the fluid in the chamber 327, or a slipping mode of operation is obtained through a controlled amount of pressurizing.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A torque-transmitting device with a prime mover unit with a driving shaft, a speed-changing transmission with a transmission input shaft, and a hydraulic coupling device between the prime mover unit and the transmission, the hydraulic coupling device having a torque-input side and a torque-output side and comprising a pump wheel, a turbine wheel connected to the torque-output side, a housing that is attached to the pump wheel and encloses the turbine wheel, and also inside the housing at least one disconnecting clutch by which the housing can be coupled to and uncoupled from the prime mover unit.

2. The torque-transmitting device of claim 1, wherein the prime mover unit is a combustion engine.

3. The torque-transmitting device of claim 1, wherein the hydraulic coupling device is a fluid coupling.

4. The torque-transmitting device of claim 1, wherein the hydraulic coupling device is a hydrodynamic torque converter comprising a stator wheel interposed between the pump wheel and the turbine wheel.

5. The torque-transmitting device of claim 1, further comprising an electrical machine including a rotor and a stator, the electrical machine being rotatable with and locked to a portion of the housing.

6. The torque-transmitting device of claim 5, wherein the electrical machine is configured to surround the housing.

7. The torque-transmitting device of claim 5, wherein the rotor is attached to said portion of the housing and the stator is non-rotatably connected to a housing part of one of the prime mover unit and the transmission.

8. The torque-transmitting device of claim 5, comprising an inertial mass connected to the rotor.

9. The torque-transmitting device of claim 8, wherein the inertial mass is arranged in a space located axially between the rotor and the prime mover unit.

10. The torque-transmitting device of claim 8, wherein the inertial mass is shaped to conform to a surface part of the housing that faces towards the prime mover unit, leaving a clearance gap between the inertial mass and said surface part.

11. The torque-transmitting device of claim 10, wherein the surface part is conically sloped.

12. The torque-transmitting device of claim 1, wherein the disconnecting clutch comprises at least one friction lining.

13. The torque-transmitting device of claim 1, wherein the disconnecting clutch comprises laminar disks.

14. The torque-transmitting device of claim 1, wherein the disconnecting clutch comprises a first piston that is locked to and is rotatable with a driving part and is axially movable between a position where the first piston is coupled to the housing and a position where the first position is uncoupled from the housing.

15. The torque-transmitting device of claim 14, wherein the first piston is controlled by a fluid-operated control device.

16. The torque-transmitting device of claim 15, wherein the fluid-operated control device comprises at least one electric pump.

17. The torque-transmitting device of claim 15, wherein the first piston has friction linings and torque is transmitted along a torque-flow path between the driving shaft and the housing, and when the friction linings are in contact with the housing, a first pressurizable chamber is formed by the first piston, the housing, and the part of the driving shaft that extends into the housing, so that when the chamber is pressurized, the friction linings are retracted from the housing and the torque-flow path is interrupted.

18. The torque-transmitting device of claim 17, additionally comprising a lockup clutch that can be coupled to the housing for the purpose of bypassing the hydraulic coupling device through a frictional engagement between the housing and the transmission input shaft.

19. The torque-transmitting device of claim 18, wherein the lockup clutch comprises a second piston that carries friction linings, the second piston being axially movable relative to and non-rotatably connected to a driven part.

20. The torque-transmitting device of claim 19, wherein the driven part is the transmission input shaft.

21. The torque-transmitting device of claim 19, wherein the friction linings of the second piston are in frictional engagement with the first piston.

22. The torque-transmitting device of claim 21, wherein at least one of the first and second pistons comprises conical friction linings providing a frictional engagement with complementary conical friction surfaces.

23. The torque-transmitting device of claim 19, wherein the first and second pistons define a second chamber for a pressurizable fluid, so that when the fluid is pressurized, the friction linings of the second piston can be disengaged from the first piston.

24. The torque-transmitting device of claim 23, wherein the second chamber is supplied with fluid of a pressure different from that of fluid in the first pressurizable chamber.

25. The torque-transmitting device of claim 19, comprising along the outer circumference of the housing a means for carrying friction surfaces complementary to the friction linings of the first and second pistons.

26. The torque-transmitting device of claim 25, wherein the means for carrying friction surfaces is an annular, flange-like part extending radially towards the interior of the housing and serving as friction surface for at least one of the first and second pistons.

27. The torque-transmitting device of claim 26, wherein the annular, flange-like part comprises on each side an axially facing friction surface to match respectively corresponding friction linings of the first and second pistons.

28. The torque-transmitting device of claim 26, wherein the annular, flange-like part conforms to the cone-shaped contour of a part of the housing that faces towards the prime mover unit.

29. The torque-transmitting device of claim 25, wherein the respective friction linings of the first and second pistons are arranged so that they engage corresponding friction surfaces located at different radii on the housing.

30. The torque-transmitting device of claim 29, wherein slope angles $\alpha_1$ and $\alpha_2$ are defined as the angles enclosed on one side by a line perpendicular to the driving shaft and on an opposite side by the respective friction linings of the disconnecting clutch and the lockup clutch and wherein $\alpha_1$ is smaller than $\alpha_2$.

31. The torque-transmitting device of claim 30, wherein the slope angles $\alpha_1$ and $\alpha_2$ are between 90° and 180°.

32. The torque-transmitting device of claim 31, wherein the slope angles $\alpha_1$ and $\alpha_2$ are between 120° and 170°.

33. The torque-transmitting device of claim 25, wherein the friction linings of the disconnecting clutch are arranged at a radius inside the friction linings of the lockup clutch.

34. The torque-transmitting device of claim 18, further comprising at least one common damper device working between one of the turbine wheel and the lockup clutch on the one hand and the transmission input shaft on the other.

35. The torque-transmitting device of claim 34, wherein the common damper device comprises a first damper that is interposed between one of the turbine wheel and the lockup clutch on the one hand and the transmission input shaft on the other hand, and the common damper device further comprises a second damper that is interposed between the driving shaft and the housing.

36. The torque-transmitting device of claim 14, wherein the first piston is controlled by a pressure that is generated by a transmission oil pump of the speed-changing transmission.

37. The torque-transmitting device of claim 14, wherein the driving part is a part of the driving shaft that extends into the housing.

38. The torque-transmitting device of claim 37, further comprising an elastically flexible, ring-shaped part that is interposed radially between the first piston and the part of the driving shaft that extends into the housing, said elastically flexible, ring-shaped part providing the first piston with axial mobility.

39. The torque-transmitting device of claim 38, wherein the elastically flexible, ring-shaped part has a wave-shaped radial cross-section.

40. The torque-transmitting device of claim 14, comprising at least three leaf springs circumferentially distributed, each of the leaf springs having an end facing towards the circumference and connected to the first piston and an opposite end connected to an axially adjacent driving part, so that the axial movement of the first piston is performed in opposition to the force generated by the leaf springs.

41. The torque-transmitting device of claim 40, wherein the axially adjacent driving part is one of the group of parts that consists of any parts of the housing, a part of the driving shaft that extends into the housing, and the driving shaft itself.

42. The torque-transmitting device of claim 1, wherein the disconnecting clutch is a dual-function clutch that can perform the function of a lockup clutch in addition to the function of the disconnecting clutch.

43. The torque-transmitting device of claim 42, wherein the dual-function clutch is axially movable and is provided with form-locking elements whereby it can be selectively engaged to one of the driving shaft and the transmission input shaft.

44. The torque-transmitting device of claim 43, wherein the form-locking elements comprise toothed profiles.

45. The torque-transmitting device of claim 43, wherein the dual-function clutch comprises a piston, a chamber for pressurizable fluid disposed between the housing and a side of the piston facing towards the prime mover unit, and a pressure-actuated control flange performing the selective engagements, so that the control flange is pushed towards the prime mover unit and engages the driving shaft when the actuating pressure behind the control flange is greater than in the pressurizable chamber, and the control flange is pushed towards and engaged to the transmission input shaft when the actuating pressure behind the control flange is smaller than in the pressurizable chamber.

46. The torque-transmitting device of claim 42 comprising a free-wheeling hub interposed between the driving shaft and the housing, whereby a torque transmitted from the prime mover unit through the driving shaft is introduced into the housing when the dual-function clutch is disengaged from the driving shaft.

47. The torque-transmitting device of claim 1, further comprising a damper device arranged to operate between the turbine wheel and the transmission input shaft.

48. The torque-transmitting device of claim 1, comprising a damper device arranged to operate between the driving shaft and the transmission input shaft.

49. The torque-transmitting device of claim 1, further comprising a common damper device working between the driving shaft and the housing.

50. A method for starting a prime mover unit that has a driving shaft and is connectable to an input shaft of a speed-changing transmission through a torque-transmitting device arranged between the prime mover unit and the transmission, the torque-transmitting device having a housing and inside the latter a clutch by which the prime mover unit can be selectively engaged and disengaged with the torque-transmitting device, comprising the steps of:

(a) with the clutch disengaged, accelerating a rotatable inertial mass of the torque-transmitting device by means of an electric machine that is rotatable with the housing;

(b) engaging the clutch, thereby setting the driving shaft into rotary motion and starting the prime mover unit.

51. The method of claim 50, wherein the clutch is operated hydraulically by means of a pressure-supplying device.

52. The method of claim 51, wherein the pressure-supplying device comprises a pump selected from the group that consists of pumps belonging to the speed-changing transmission, pumps belonging to the torque-transmitting device, and separate, electrically powered pumps.

* * * * *